(12) United States Patent
Hassan et al.

(10) Patent No.: US 9,703,139 B2
(45) Date of Patent: Jul. 11, 2017

(54) METHODS FOR TRIMMING POLARIZERS IN DISPLAYS

(71) Applicant: Apple Inc., Cupertino, CA (US)

(72) Inventors: Mohd Fadzli A. Hassan, San Francisco, CA (US); Nathan K. Gupta, San Francisco, CA (US); Yu-Cheng Chen, Shanghai (CN)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 14/617,758

(22) Filed: Feb. 9, 2015

(65) Prior Publication Data

US 2016/0231619 A1 Aug. 11, 2016
US 2016/0334668 A9 Nov. 17, 2016

Related U.S. Application Data

(62) Division of application No. 13/656,267, filed on Oct. 19, 2012, now Pat. No. 8,988,636.

(Continued)

(51) Int. Cl.
*G02F 1/1335* (2006.01)
*G02B 5/30* (2006.01)
(Continued)

(52) U.S. Cl.
CPC ......... *G02F 1/133528* (2013.01); *G02B 1/14* (2015.01); *G02B 5/305* (2013.01);
(Continued)

(58) Field of Classification Search
CPC .......... G09G 2300/0439; G09G 3/3659; H01L 23/49534; H01L 27/124; H01L 27/3276;
(Continued)

(56) References Cited

U.S. PATENT DOCUMENTS 5,601,742 A  2/1997 Yamashita
5,776,220 A  7/1998 Allaire et al.
(Continued)

FOREIGN PATENT DOCUMENTS

CN  1537251  10/2004
CN  102177538  9/2011
(Continued)

OTHER PUBLICATIONS

Gupta et al., U.S. Appl. No. 61/745,117, filed Dec. 21, 2012.

*Primary Examiner* — Tracie Y Green
(74) *Attorney, Agent, or Firm* — Treyz Law Group, P.C.; G. Victor Treyz; Zachary D. Hadd

(57) ABSTRACT

An electronic device is provided with a display such as a liquid crystal display mounted in an electronic device housing. The display has a layer of liquid crystal material sandwiched between an upper display layer such as a color filter layer and a lower display layer such as a thin-film-transistor layer. An upper polarizer is formed on the upper surface of the color filter layer. A lower polarizer is formed on the lower surface of the thin-film-transistor layer. To protect display layers such as a glass color filter layer substrate for the color filter layer from damage during polarizer trimming operations, a coating is deposited on a peripheral edge of the glass color filter layer substrate. The coating may be formed from an elastomeric polymer such as silicone and may remain in place or may be removed following trimming operations.

16 Claims, 17 Drawing Sheets

Related U.S. Application Data

(60) Provisional application No. 61/703,719, filed on Sep. 20, 2012.

(51) Int. Cl.
*G02F 1/1368* (2006.01)
*G02B 1/14* (2015.01)
*G02F 1/13* (2006.01)
*G02F 1/1333* (2006.01)

(52) U.S. Cl.
CPC .......... *G02F 1/1303* (2013.01); *G02F 1/1368* (2013.01); *G02F 1/133351* (2013.01); *G02F 2001/133302* (2013.01); *G02F 2201/50* (2013.01)

(58) Field of Classification Search
CPC ............... H01L 27/3279; H01L 27/329; H01L 27/3297; H01L 2933/0016
See application file for complete search history.

(56) References Cited

U.S. PATENT DOCUMENTS

| | | | |
|---|---|---|---|
| 6,028,288 A | 2/2000 | Moriike | |
| 6,379,509 B2 | 4/2002 | Choi et al. | |
| 6,407,360 B1 | 6/2002 | Choo et al. | |
| 6,512,196 B1 | 1/2003 | Yoon et al. | |
| 6,645,675 B1 | 11/2003 | Munshi | |
| 6,689,544 B2 | 2/2004 | Nagarkar et al. | |
| 6,995,916 B2 | 2/2006 | Yamanaka et al. | |
| 7,046,312 B2 | 5/2006 | Koyama et al. | |
| 7,202,923 B2 | 4/2007 | Yamabuchi et al. | |
| 7,317,499 B2 | 1/2008 | Paukshto et al. | |
| 7,520,654 B2 | 4/2009 | Freking | |
| 7,876,502 B2 | 1/2011 | Ito et al. | |
| 7,976,657 B2 | 7/2011 | Kimura et al. | |
| 8,034,209 B2 | 10/2011 | Danner et al. | |
| 8,235,761 B2 | 8/2012 | Tannas, Jr. | |
| 8,259,263 B2 | 9/2012 | Kimura et al. | |
| 8,614,776 B2 | 12/2013 | Lee et al. | |
| 2003/0193625 A1* | 10/2003 | Yoshida ............... G02F 1/1393 349/43 |
| 2004/0085492 A1 | 5/2004 | Saitoh | |
| 2005/0238852 A1 | 10/2005 | Nakayama et al. | |
| 2006/0197904 A1 | 9/2006 | Kinoshita et al. | |
| 2007/0188688 A1 | 8/2007 | Hwang et al. | |
| 2007/0211331 A1 | 9/2007 | Danner et al. | |
| 2009/0002588 A1* | 1/2009 | Lee .................. G02F 1/133707 349/42 |
| 2009/0130341 A1 | 5/2009 | Asada | |
| 2009/0316062 A1 | 12/2009 | Nishizawa | |
| 2010/0147814 A1 | 6/2010 | Watanabe | |
| 2010/0210055 A1 | 8/2010 | Yoon et al. | |
| 2011/0109829 A1 | 5/2011 | Mathew et al. | |
| 2011/0199348 A1 | 8/2011 | Takatani | |
| 2012/0020001 A1 | 1/2012 | Mathew et al. | |
| 2012/0099056 A1* | 4/2012 | Lee ...................... B23K 26/009 349/106 |
| 2012/0200812 A1* | 8/2012 | Qi ......................... B23K 26/38 349/106 |
| 2014/0175684 A1 | 6/2014 | Hassan | |
| 2014/0176848 A1 | 6/2014 | Gupta et al. | |

FOREIGN PATENT DOCUMENTS

| | | |
|---|---|---|
| CN | 102626833 | 8/2012 |
| EP | 1122584 | 10/2007 |
| KR | 10-2012-0043370 | 5/2012 |
| KR | 10-2012-0043470 A | 5/2012 |

\* cited by examiner

METHODS FOR TRIMMING POLARIZERS IN DISPLAYS

This application is a division of U.S. patent application Ser. No. 13/656,267, filed Oct. 19, 2012, which claims the benefit of U.S. provisional patent application No. 61/703,719, filed Sep. 20, 2012. This application claims the benefit of and claims priority to U.S. patent application Ser. No. 13/656,267, filed Oct. 19, 2012, and U.S. provisional patent application No. 61/703,719, filed Sep. 20, 2012, which are hereby incorporated by reference herein in their entireties.

BACKGROUND

This relates generally to electronic devices and, more particularly, to electronic devices with displays.

Electronic devices often include displays. For example, cellular telephones and portable computers often include displays for presenting information to a user.

Displays such as liquid crystal display have polarizers. The polarizers are formed from polymer layers that are laminated to glass display layers. It may be desirable to ensure that a polarizer layer has the same size as an associated glass display layer. If the polarizer is too large, the edge of the polarizer will overhang the edge of the glass display layer. If the polarizer is too small, the edge of the display will have an unsightly visible polarizer edge. Although the polarizer edge may be covered with a plastic bezel, the use of a bezel reduces the visible area of a display and can make the display unattractive.

It would therefore be desirable to be able to provide improved displays with polarizers for electronic devices.

SUMMARY

An electronic device is provided with a display such as a liquid crystal display mounted in an electronic device housing. The display has a layer of liquid crystal material sandwiched between an upper display layer such as a color filter layer and a lower display layer such as a thin-film-transistor layer.

An upper polarizer is formed on the upper surface of the color filter layer. A lower polarizer is formed on the lower surface of the thin-film-transistor layer. Additional display structures provide backlight for the display.

To protect display layers such as a glass color filter layer substrate for the color filter layer from damage during polarizer trimming operations, a coating is deposited on a peripheral edge of the glass color filter layer substrate. The coating is formed from an elastomeric polymer such as silicone or other material that coats and protects the peripheral edge. The coating may remain in place following polarizer trimming or may be removed following trimming operations.

Further features, their nature and various advantages will be more apparent from the accompanying drawings and the following detailed description of the preferred embodiments.

DETAILED DESCRIPTION

Displays in electronic devices such as liquid crystal displays may be provided with polarizers. Illustrative electronic devices that have displays with polarizers are shown in FIGS. 1, 2, 3, and 4.

Figure 1:
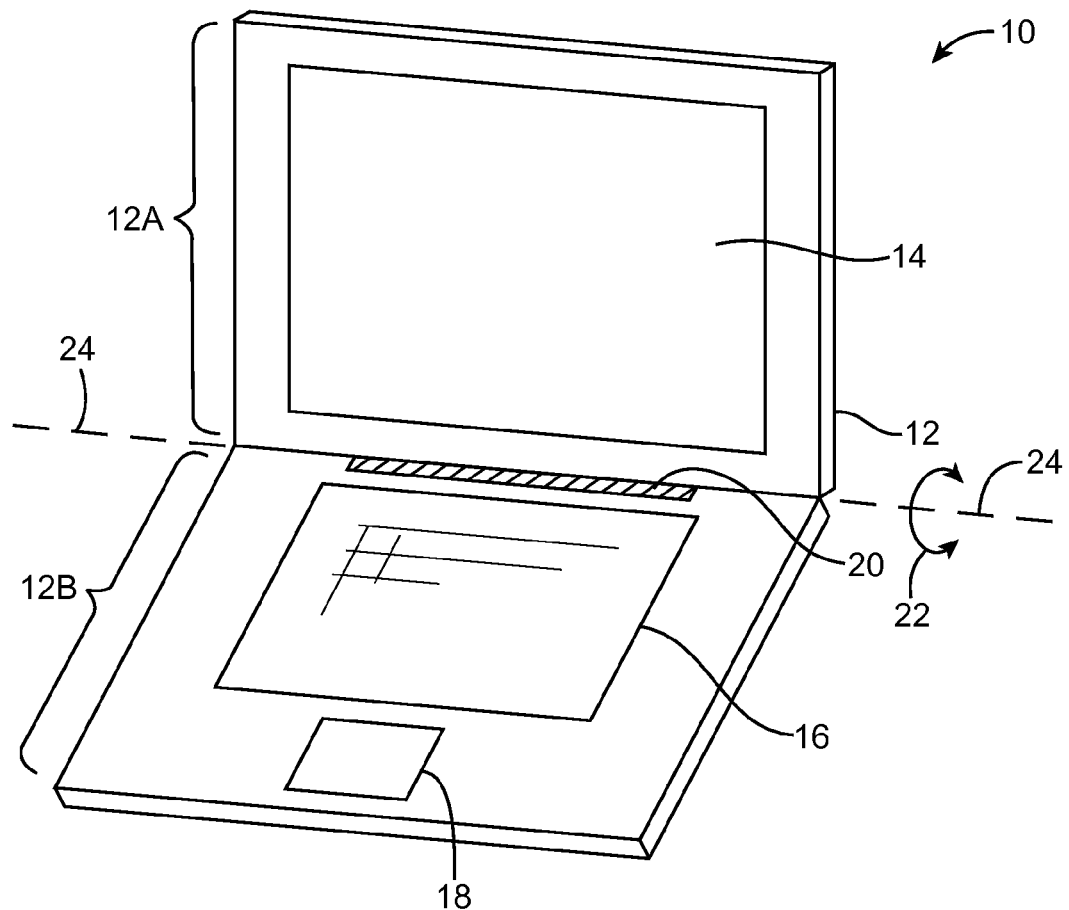
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 to allow upper housing 12A to rotate in directions 22 about rotational axis 24 relative to lower housing 12B. Display 14 is mounted in upper housing 12A. Upper housing 12A, which may sometimes referred to as a display housing or lid, is placed in a closed position by rotating upper housing 12A towards lower housing 12B about rotational axis 24.

Figure 2:
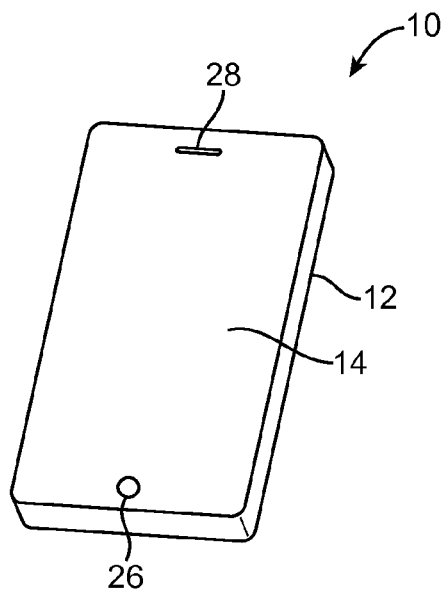
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
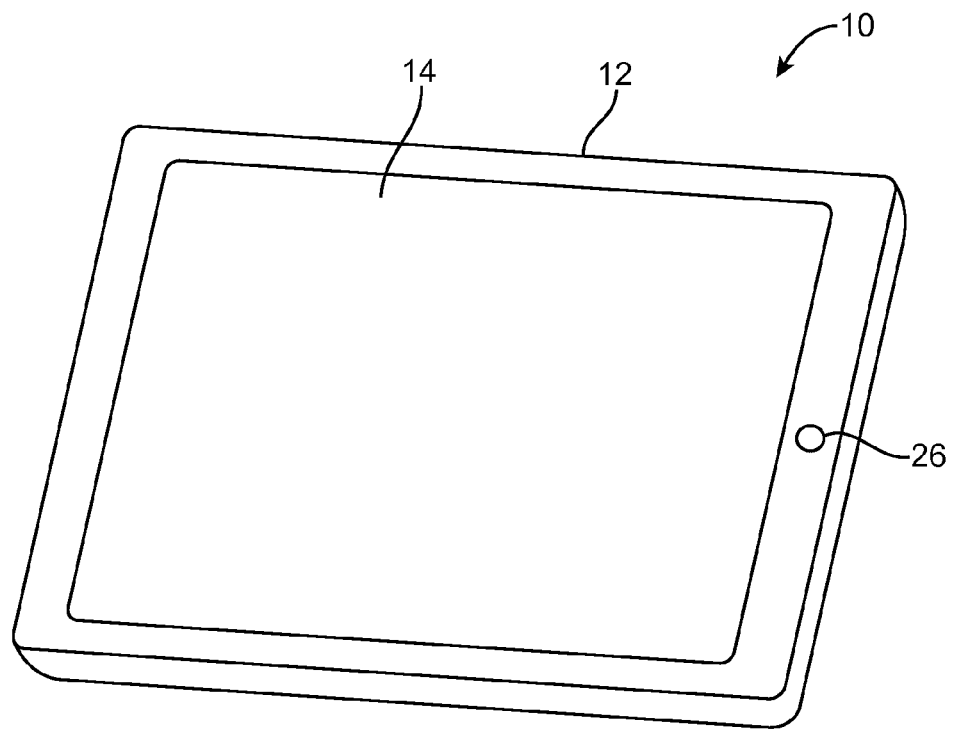
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
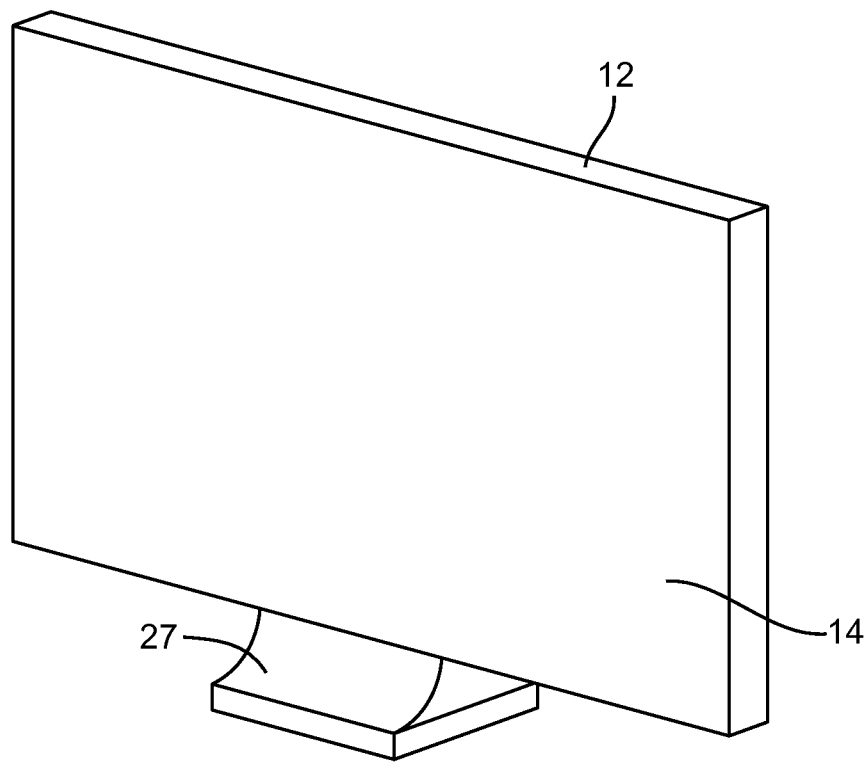
FIG. 4 is a perspective view of an illustrative electronic device such as a computer display with display structures in accordance with an embodiment.

FIG. 4 shows an illustrative configuration for electronic device 10 in which device 10 is a computer display or a computer that has been integrated into a computer display. With this type of arrangement, housing 12 for device 10 is mounted on a support structure such as stand 27. Display 14 is mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, is formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
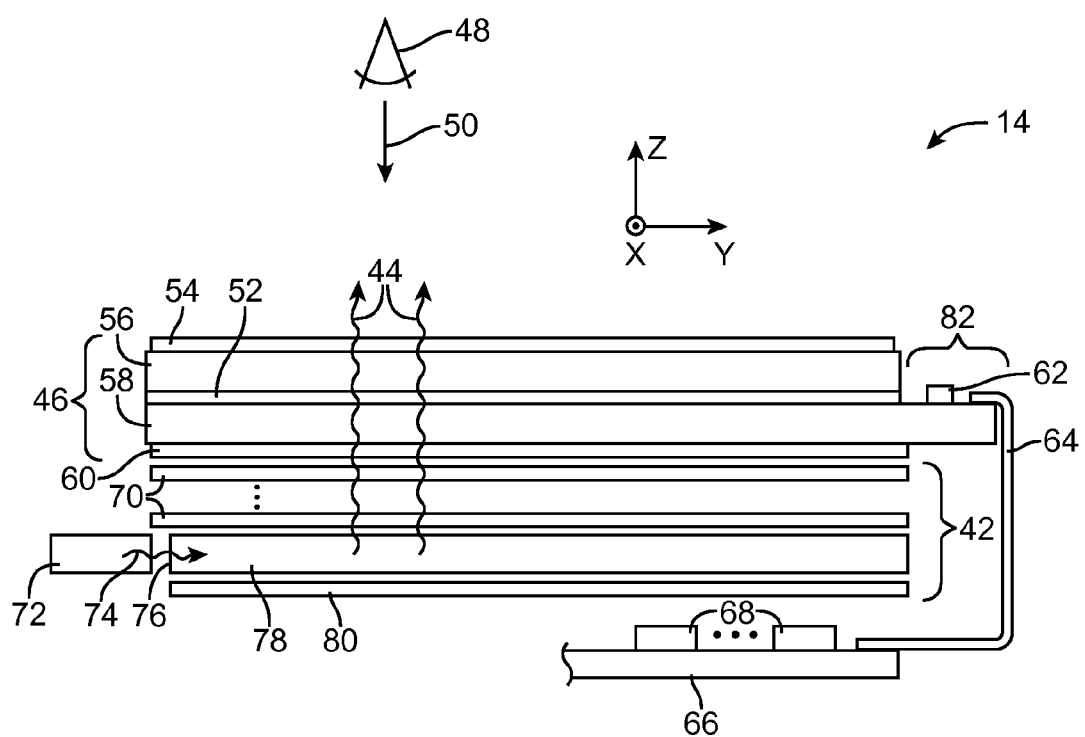
FIG. 5 a cross-sectional side view of an illustrative display of the type that may be used in devices of the types shown in FIGS. 1, 2, 3, and 4 in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 includes backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 illuminates images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 form a liquid crystal display or may be used in forming displays of other types.

In a configuration in which display layers 46 are used in forming a liquid crystal display, display layers 46 include a liquid crystal layer such a liquid crystal layer 52. Liquid crystal layer 52 is sandwiched between display layers such as display layers 58 and 56. Layers 56 and 58 are interposed between lower polarizer layer 60 and upper polarizer layer 54.

Layers 58 and 56 are formed from transparent substrate layers such as clear layers of glass or plastic. Layers 56 and 58 are layers such as a thin-film transistor layer (e.g., a thin-film-transistor substrate such as a glass layer coated with a layer of thin-film transistor circuitry) and/or a color filter layer (e.g., a color filter layer substrate such as a layer of glass having a layer of color filter elements such as red, blue, and green color filter elements arranged in an array). Conductive traces, color filter elements, transistors, and other circuits and structures are formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 is a thin-film transistor layer that includes an array of thin-film transistors and associated electrodes (display pixel electrodes) for applying electric fields to liquid crystal layer 52 and thereby displaying images on display 14. Layer 56 is a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits such as components 68 on printed circuit 66 of FIG. 5 and/or other circuitry) is used to generate information to be displayed on display 14 (e.g., display data). The information to be displayed is conveyed from circuitry 68 to display driver integrated circuit 62 using a signal path such as a signal path formed from conductive metal traces in flexible printed circuit 64 (as an example).

Display driver circuitry such as display driver integrated circuit 62 of FIG. 5 is mounted on thin-film-transistor layer driver ledge 82 or elsewhere in device 10. A flexible printed circuit cable such as flexible printed circuit 64 is used in routing signals between printed circuit 66 and thin-film-transistor layer 58. If desired, display driver integrated circuit 62 may be mounted on printed circuit 66 or flexible printed circuit 64. Printed circuit 66 is formed from a rigid printed circuit board (e.g., a layer of fiberglass-filled epoxy) or a flexible printed circuit (e.g., a flexible sheet of polyimide or other flexible polymer layer).

Backlight structures 42 include a light guide plate such as light guide plate 78. Light guide plate 78 is formed from a transparent material such as clear glass or plastic. During operation of backlight structures 42, a light source such as light source 72 generates light 74. Light source 72 may be, for example, an array of light-emitting diodes.

Light 74 from one or more light sources such as light source 72 is coupled into one or more corresponding edge surfaces such as edge surface 76 of light guide plate 78 and is distributed in dimensions X and Y throughout light guide plate 78 due to the principal of total internal reflection. Light guide plate 78 includes light-scattering features such as pits or bumps. The light-scattering features are located on an upper surface and/or on an opposing lower surface of light guide plate 78.

Light 74 that scatters upwards in direction Z from light guide plate 78 serves as backlight 44 for display 14. Light 74 that scatters downwards is reflected back in the upwards direction by reflector 80. Reflector 80 is formed from a reflective material such as a layer of white plastic or other shiny materials.

To enhance backlight performance for backlight structures 42, backlight structures 42 include optical films 70. Optical films 70 include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 overlap the other structures in backlight unit 42 such as light guide plate 78 and reflector 80. For example, if light guide plate 78 has a rectangular footprint in the X-Y plane of FIG. 5, optical films 70 and reflector 80 preferably have a matching rectangular footprint.

The outermost layer of display 14 may be a protective display layer such as a layer of glass that covers layers 46 or a display layer such as color filter layer 56 (e.g., a glass substrate layer in layer 56) may serve as the outermost structural layer in display 14. When display layer 56 is used as the outermost substrate layer in display 14, visible border structures in display 14 can be minimized by accurately trimming polarizer 54 along the edge of layer 56. Polarizing trimming operations can be performed using lasers, cutting blades (knife edges), or other trimming equipment. Care should be taken during trimming operations not to damage display layer 56. As an example, care should be taken not to induce thermal damage to a glass substrate in layer 56 during laser trimming operations or mechanical damage to a glass substrate in layer 56 during cutting blade trimming operations.

Figure 6:
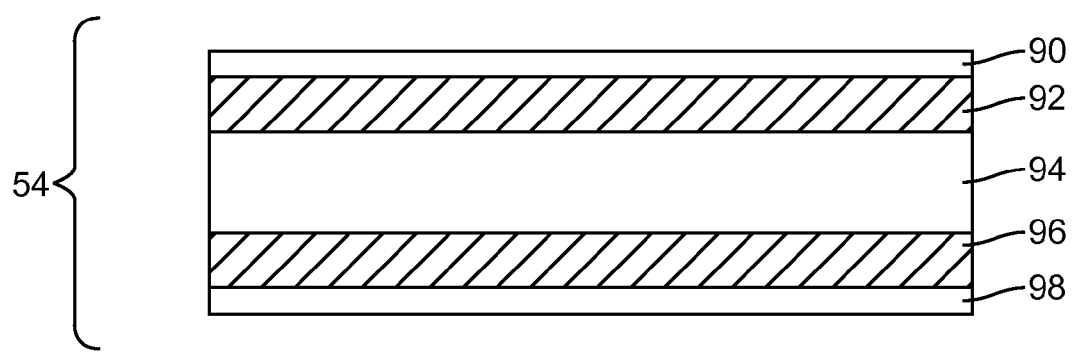
FIG. 6 is a cross-sectional side view of an illustrative polarizer layer in accordance with an embodiment.

A cross-sectional side view of an illustrative polarizer layer in display 14 is shown in FIG. 6. Polarizer layer 54 of FIG. 6 is an upper polarizer such as upper polarizer 54 of FIG. 5. Lower polarizer layers such as lower polarizer 60 may be constructed similarly.

In the example of FIG. 6, polarizer 54 is formed from multiple layers of material that are attached together. Polarizer film 94 is formed from a stretched polymer such as stretched polyvinyl alcohol (PVA) and may therefore sometimes be referred to as a PVA layer. Iodine may be placed on the stretched PVA film so that iodine molecules align with the stretched film and form the polarizer. Other types of polarizer films may be used if desired.

Polarizer film 94 is sandwiched between layers 92 and 96. Layers 92 and 96 may be formed from a material such as tri-acetyl cellulose (TAC) and may sometimes be referred to as TAC films or may be formed from other polymers. The TAC films may help hold the PVA film in its stretched configuration and may protect the PVA film. Other films may be attached to polarizer film 94 if desired.

Coating layer 90 includes one or more films of material that provide polarizer 54 with desired surface properties. For example, layer 90 may be formed from materials that provide polarizer 54 with antiglare (light diffusing) properties, antireflection properties, scratch resistance, fingerprint resistance, and other desired properties. Layer 90 preferably is formed from one or more layers of material such as antireflection (AR) layers (e.g., films formed from a stack of alternating high-index-of-refraction and low-index-of-refraction layers), antiglare layers, antireflection-antiglare layers, oleophobic layers, antiscratch coatings, and other coating layers. The functions of these layers need not be mutually exclusive. For example, an antiglare film in coating 90 may help provide polarizer 54 with scratch resistance.

Polarizer 54 can be provided with a layer of adhesive such as adhesive layer 98 to help attach polarizer 54 to the upper surface of display layers 46 (i.e., color filter 56 of FIG. 5). The thickness of polarizer 54 may be about 50-200 microns or 90-180 microns (as examples). During manufacturing operations, adhesive 98 attaches polarizer 54 to the upper surface of color filter layer 56.

Trimming operations are preferably used to trim the edge of polarizer 54 to match the edge of color filter layer 56.

Figure 7:
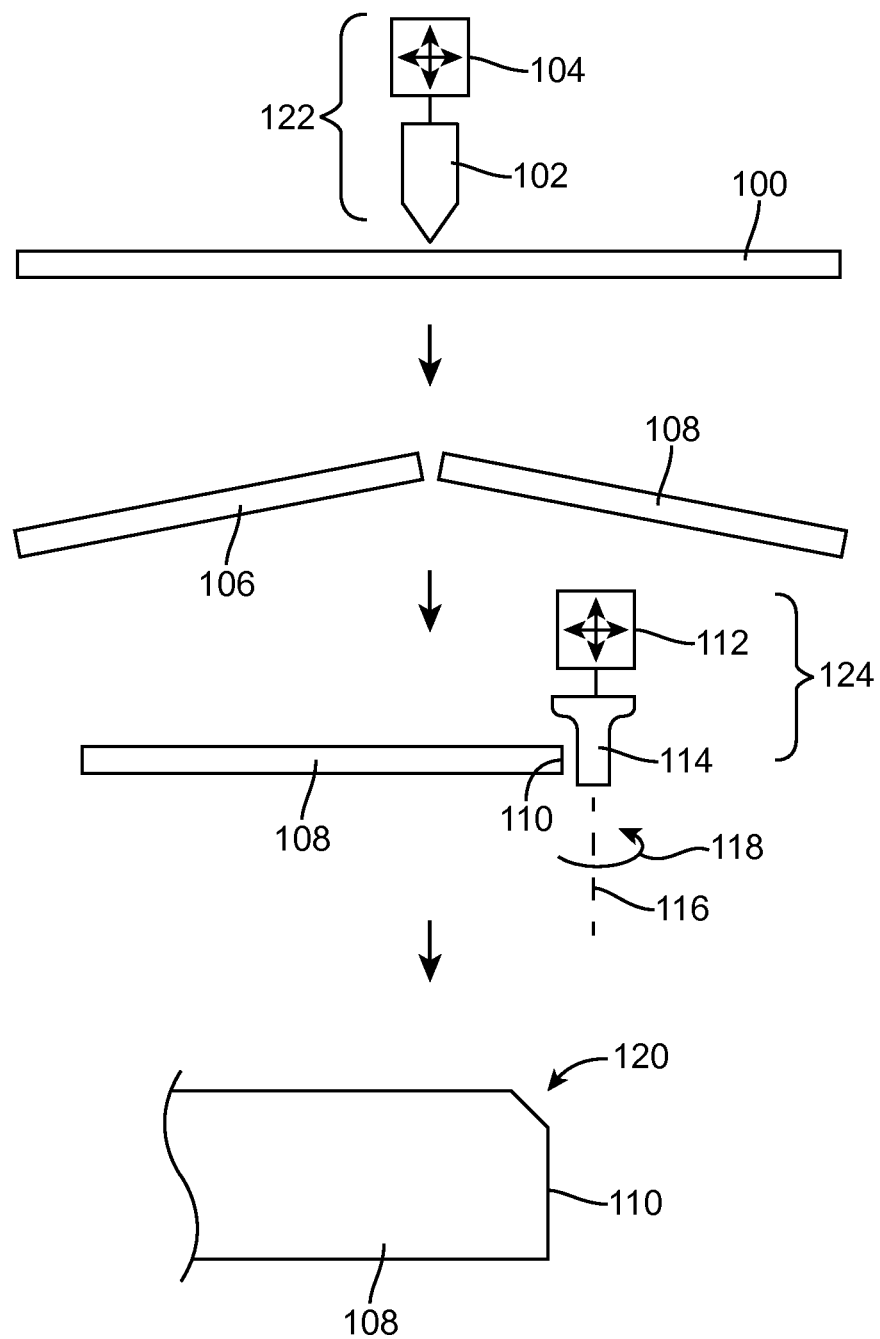
FIG. 7 is a diagram of an illustrative system being used to form a display layer such as a glass substrate layer for a liquid crystal display color filter layer in accordance with an embodiment.

As shown in FIG. 7, color filter substrates such as substrate 108 can be formed from larger sheets of material such as layer 100. Layer 100 may be a layer of glass, a ceramic layer, a polymer layer, or other suitable display layer substrate. As an example, layer 100 may be a glass layer.

Initially, glass layer 100 will be oversized (i.e., layer 100 will be larger than needed for forming display 14). Equipment such as equipment 122 is used to divide layer 100 into smaller pieces such as substrate 108. Equipment 122 may be substrate cutting equipment such as water-jet cutting equipment, laser cutting equipment, sawing equipment, machining equipment, or other equipment for dividing layer 100 into smaller pieces. In the illustrative configuration of FIG. 7, equipment 122 includes a computer-controlled positioner such as positioner 104 and a scribing tool such as scribing tool 102. Positioner 104 moves scribing tool 102 in a desired pattern over the surface of layer 100 to form scribe lines. Manual and/or automated equipment may then be used to break layer 100 along the scribe lines to form separate pieces of layer 100 such as pieces 106 and 108. Pieces 106 and 108 have the size and shape of display 14 (e.g., a rectangular display-sized piece of glass).

Following the use of scribing operations or other operations to separate out individual glass layers such as display-sized glass layer 108 from glass layer 100 using equipment 122, machining equipment 124 or other edge treatment equipment is used to modify edge surface 110 of the peripheral edge of glass layer 108. In the illustrative configuration of FIG. 7, equipment 124 includes computer-controlled positioner 112 and machining tool head 114. Head 114 has a surface profile that is configured to ease the sharp corners in layer 108 (e.g., by rounding the upper and lower edges of layer 108, by beveling the upper and lower edges of layer 108, etc.).

During operation, positioner 112 rotates machining tool head 114 about rotational axis 116 in direction 118 while moving head 114 along the edge of layer 108, thereby machining edge surface 110 of layer 108 into a desired shape. As shown at the bottom of FIG. 7, equipment 124 can provide layer 108 with a machined profile for surface 110 such as an edge profile that includes one or more bevels such as bevel 120.

Machined glass layer 108 is used as a substrate for one or more layers in display 14. For example, layer 108 may serve as a color filter layer substrate for color filter layer 56 or other display layer in display 14. If desired, substrate layer 108 may be formed form plastic, ceramic, or other transparent materials. The use of clear glass for forming layer 108 is merely illustrative.

To protect glass layer 108 from damage while supporting the edge of polarizer 54 during polarizer trimming operations, it may be desirable to provide glass layer 108 with edge protection. With one suitable arrangement, peripheral edge 110 of layer 108 is covered with a protective coating. The protective coating may be formed from plastic (e.g., silicone or other elastomeric polymer, hard plastic, etc.), ceramic, metal, or other coatings. As an example, peripheral edge 110 can be covered with black or clear silicone.

Figure 8:
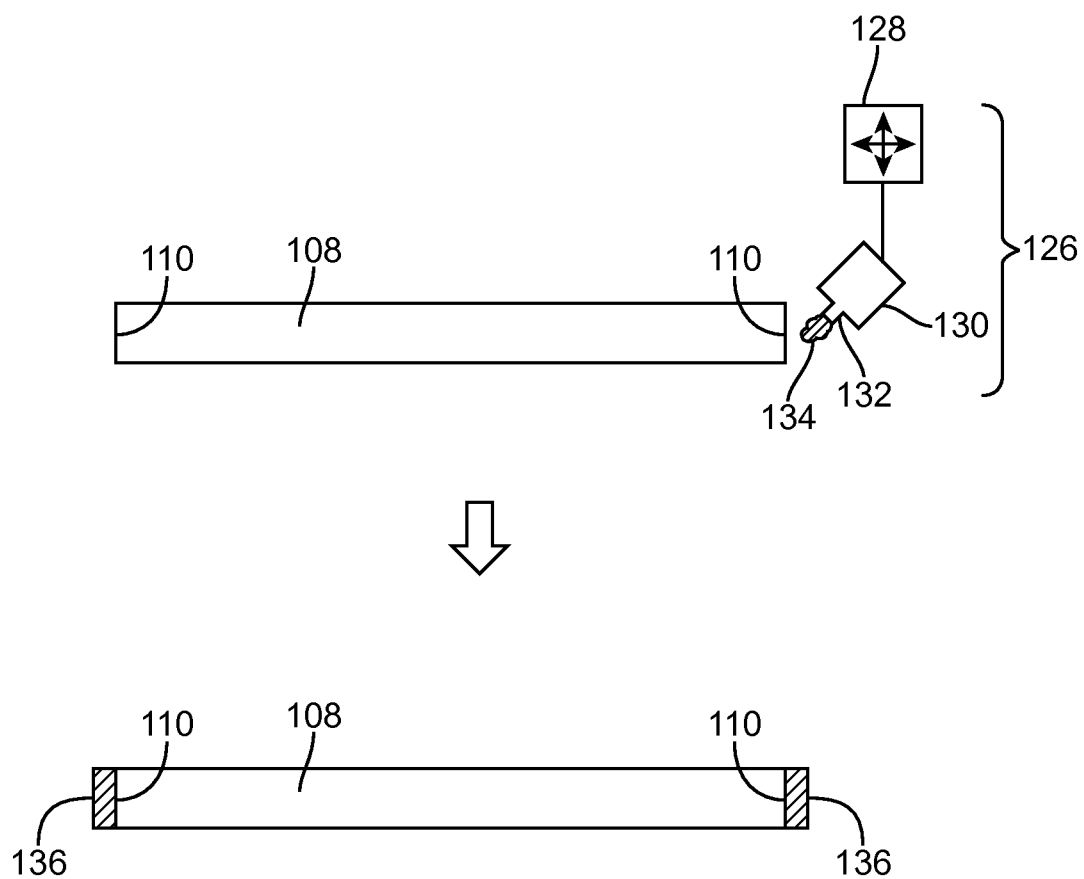
FIG. 8 is a diagram of an illustrative system that is forming an edge coating on a display layer of the type shown in FIG. 7 in accordance with an embodiment.

FIG. 8 is a diagram showing how edge 110 of glass layer 108 can be covered with a protective coating. In the example of FIG. 8, coating deposition equipment 126 is being used to dispense coating material 134 onto edge 110 of glass layer 108. Equipment 126 includes computer-controlled positioner 128, dispensing head 130, and nozzle 132. During operation, coating material 134 is dispensed onto edge surface 110 via nozzle 132 while positioner 128 runs head 130 around the periphery of glass layer 108, thereby forming edge coating 136. Equipment for dispensing material 134 may include dipping equipment, spraying equipment, ink-jet printing equipment, pad printing equipment, screen printing equipment, painting equipment, physical vapor deposition equipment, electrochemical deposition equipment, etc.

Figure 9:
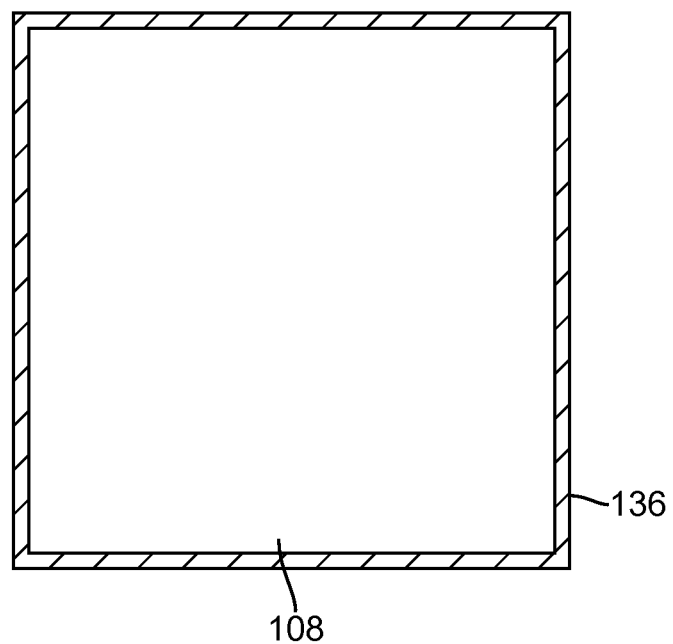
FIG. 9 is a top view of an illustrative display layer with an edge coating in accordance with an embodiment.

FIG. 9 is a top view of an illustrative display layer such as glass substrate layer 108 following coating of peripheral edge 110 with coating structures 136. In the illustrative configuration of FIG. 9, substrate layer 108 has a rectangular footprint so that edge coating 136 has a rectangular ring shape. The rectangular shape of illustrative substrate 108 in FIG. 9 allows substrate 108 to be used in forming rectangular displays. Displays of other shapes may be formed if desired.

Figure 10:
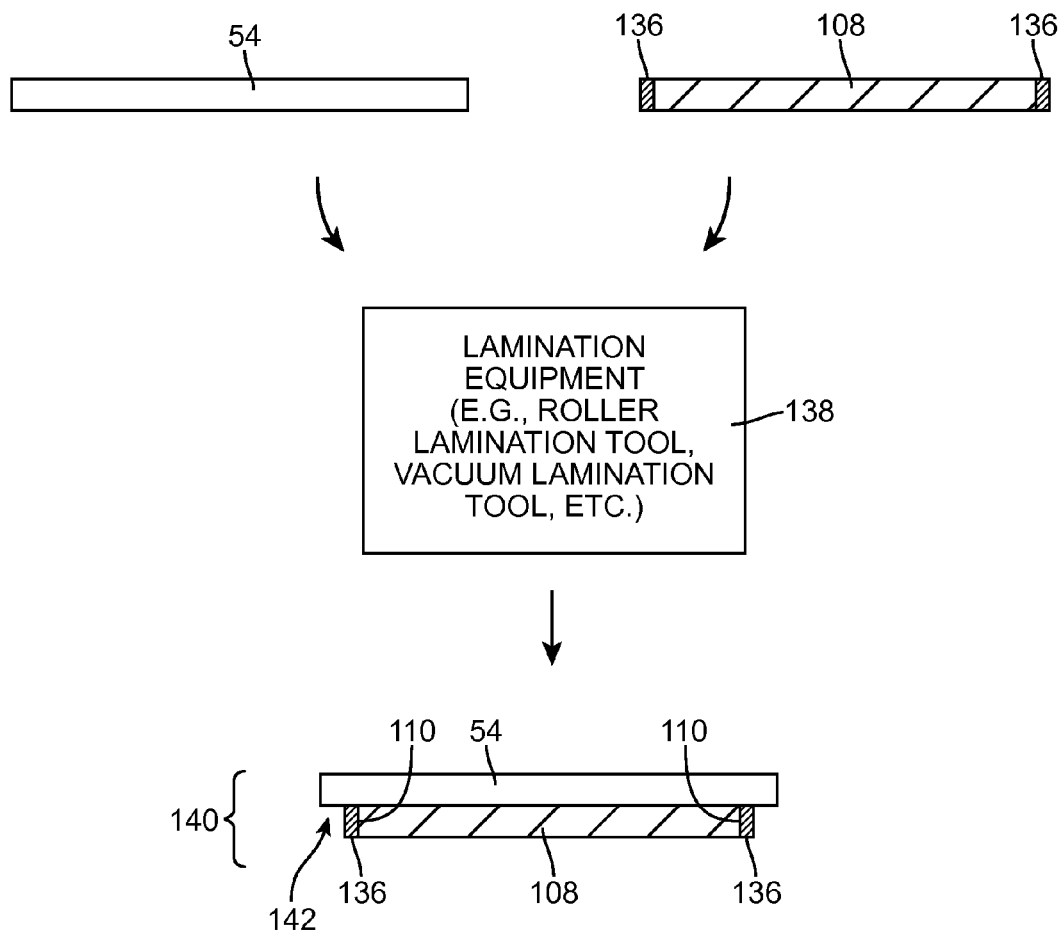
FIG. 10 is a diagram of an illustrative system being used to laminate a polarizer to a display layer with protective edge coating structures in accordance with an embodiment.

FIG. 10 is a system diagram showing how polarizer 54 may be attached to substrate layer 108. In the illustrative configuration of FIG. 10, lamination equipment 138 is being used to laminate polarizer 54 to substrate layer 108. Lamination equipment 138 may include a roller laminator, vacuum lamination equipment, or other equipment for attaching polarizer 54 to substrate 108. When attached using roller-based lamination equipment or other lamination equipment, adhesive layer 98 attaches the lower surface of polarizer 54 to the upper surface of display layer 108 to form display structures 140, as shown in the bottom of FIG. 10.

In display structures 140, polarizer 54 has larger lateral dimensions than the corresponding lateral dimensions of substrate layer 108. As a result, portions of polarizer layer 54 extend laterally beyond edge 110 of substrate 108 to form overhanging (overlapping) edge portions 142 of layer 54. Coating structures 136 may be configured to support at least some of the portion of polarizer 54 that extends laterally beyond edges 110 of substrate layer 108, as shown in FIG. 10.

Figure 11:
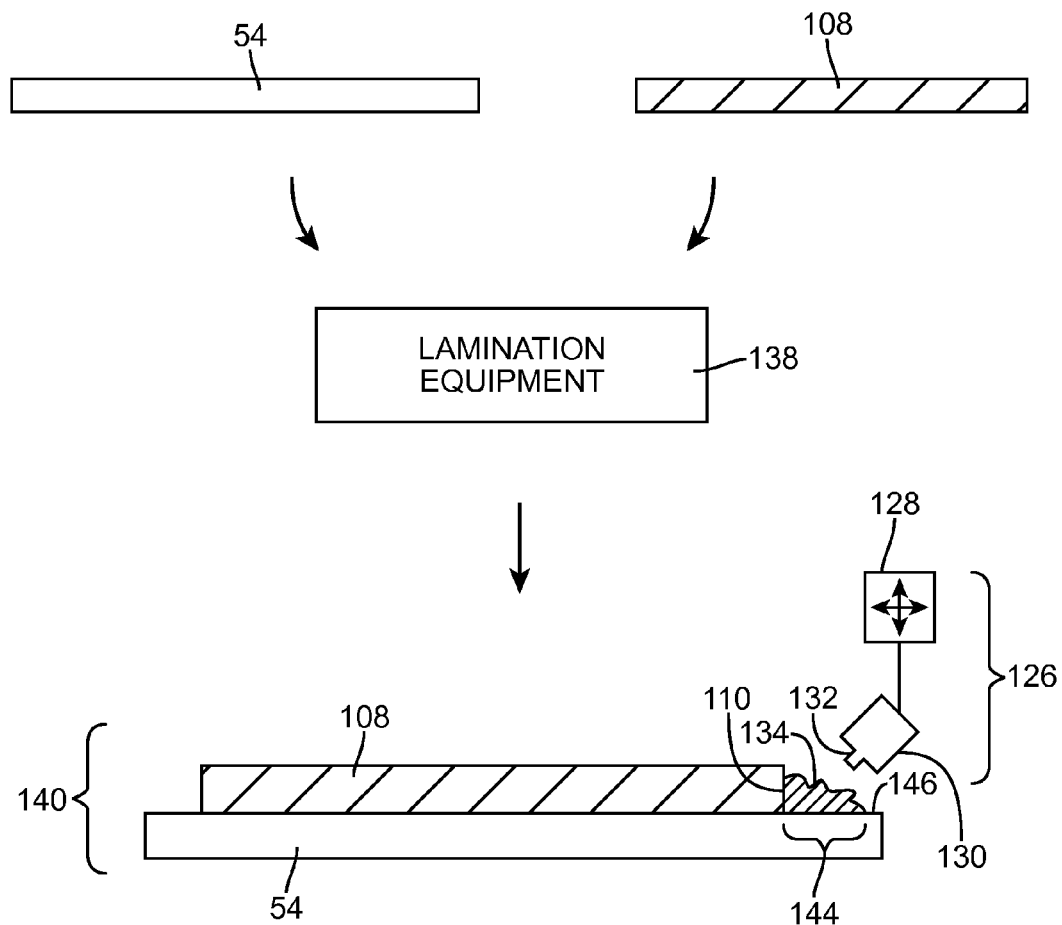
FIG. 11 is a diagram of an illustrative system being used to laminate a polarizer to a display layer and coat the peripheral edge of the display layer with a coating layer in accordance with an embodiment.

Following attachment of polarizer 54 to the upper surface of glass layer 108, polarizer 54 may be trimmed to remove excess portions such as protruding portions 142. If desired, polarizer 54 may be attached to glass substrate 108 before equipment 126 is used to apply coating material 134. This type of configuration is shown in FIG. 11. With a configuration of the type shown in FIG. 11, lamination equipment 138 receives polarizer material 54 and glass substrate 108 and laminates layer 54 to layer 108 to form structures 140. Equipment 126 includes computer-controlled positioner 128 and dispensing structures 130 with nozzle 132 or other coating equipment. Positioner 128 runs nozzle 132 along the edge of layer 108 to dispense a bead of coating material 134. Because structures 140 are inverted (i.e., because layer 108 rests on top of layer 54 in the configuration of FIG. 11), coating material 134 is supported by portion 144 of polarizer lower surface 146. The presence of portion 144 therefore helps to control the flow of coating material 134.

Figure 12:
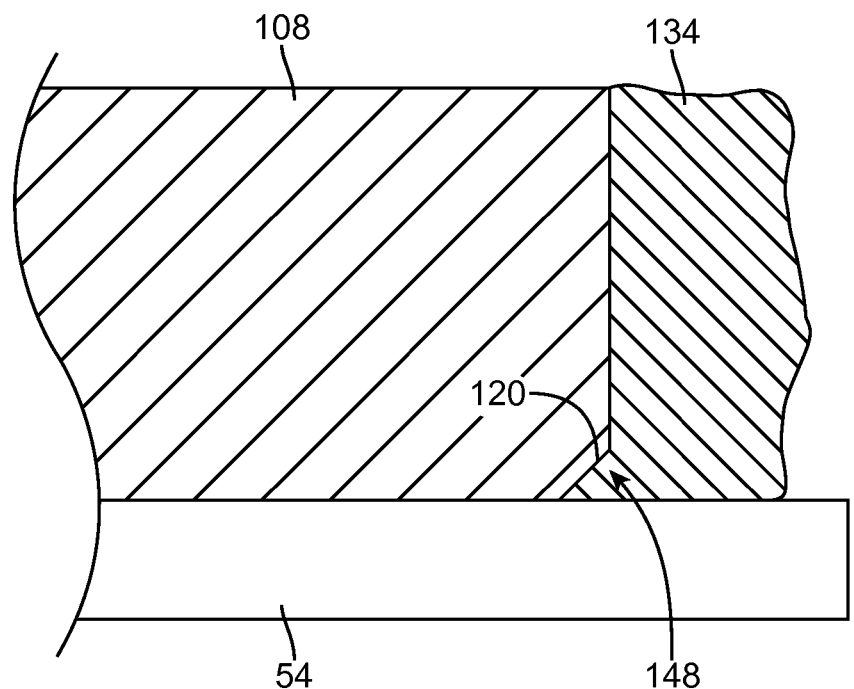
FIG. 12 is a cross-sectional side view of an illustrative display layer with an edge coating in accordance with an embodiment of the present invention.

As shown in FIG. 12, coating material 134 is preferably thin enough to wick into recesses such as recess 148 (formed by the presence of bevel 120).

Figure 13:
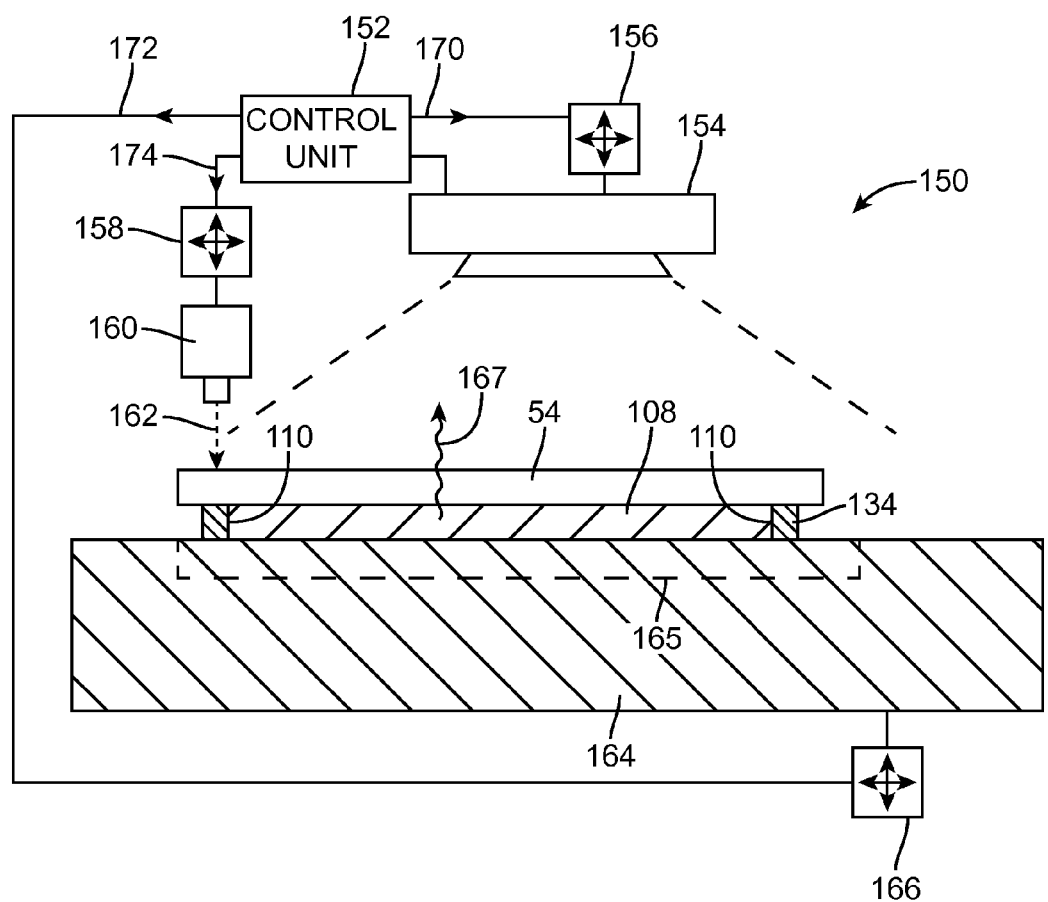
FIG. 13 is diagram of an illustrative system in which laser-based equipment is being used to trim a polarizer on a display layer in accordance with an embodiment.

A system such as system 150 of FIG. 13 or other trimming equipment is used to trim the edges of polarizer 54 following attachment of polarizer 54 to substrate layer 108. In a configuration of the type shown in FIG. 13, system 150 includes a camera such as camera 154 for capturing images of layers 54 and 108. Camera 154 includes a digital image sensor that captures digital image data for processing by control unit 152. Camera 154 preferably has sufficient resolution for capturing images of edge 110. Layers 108 and 54 are supported by support structures 164 during digital imaging operations. Light source 165 in support structures 164 generates polarized and/or unpolarized backlight 167 for illuminating layers 108 and 54. The use of polarized light in illuminating layers 108 and 54 can help delineate the location of edge 110 for camera 154.

Data from camera 154 is analyzed by control unit 152 to determine the position of edge 110 relative to laser 160 and laser beam 162. Laser 160 may be an infrared laser such as a carbon dioxide laser operating at a wavelength of 9.6 microns (as an example). Control unit 152 may be one or more computers, embedded processors, networked computing equipment, online computing equipment, and/or other computing equipment for processing digital image data from camera 154 or other sensors to determine the location of edges 110 and for issuing corresponding control signals on outputs 170, 172, and 174.

The control signals on outputs 170 172, and 174 control the operation of computer-controlled positioners 156, 158, and 166, respectively. For example, control commands on path 170 control the operation of positioner 156, which is used in adjusting the position of camera 154. Control signals on path 172 are used in controlling the operation of positioner 166, which is used in adjusting the position of support 164 (and therefore layers 108 and 54) relative to laser beam 162. Control signals on line 174 are used to control positioner 158 and thereby adjust the position of laser 160 and laser beam 162 relative to edge 110. If desired, different arrangements of positioners may be used. As an example, the position of machine vision equipment such as camera 154 may be fixed and/or positioner 158 and/or positioner 166 may be omitted. Additional positioners (e.g. to control mirrors or other optical structures that direct beam 162 onto layer 54) may also be used. The configuration of FIG. 13 is shown as an example.

Figure 14:
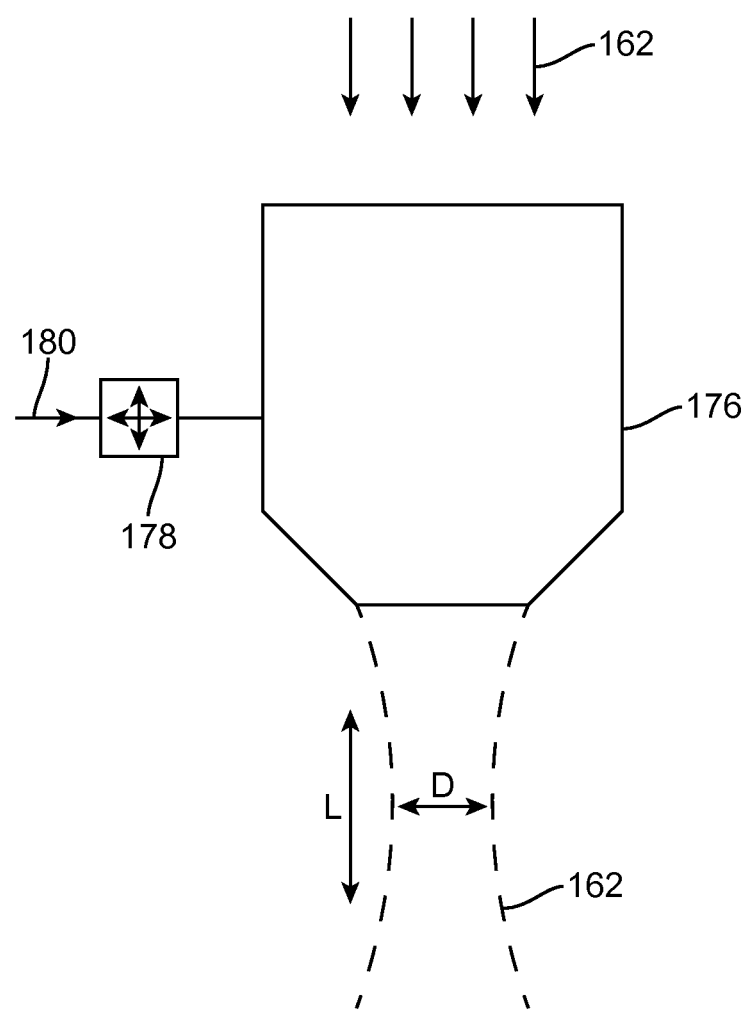
FIG. 14 is side view of an illustrative focusing lens and focused laser beam of the type used in laser trimming a polarizer on a display layer with the equipment of FIG. 13 in accordance with an embodiment.

Optical structures such as lens 176 of FIG. 14 are used to focus laser beam 162. In the configuration of FIG. 14, the position of lens 176 is controlled by positioner 178. Positioner 178 is a computer-controlled positioner that receives control signals from control unit 152 via input 180. In response, positioner 178 positions lens 176 and therefore laser beam 162 relative to layer 54 and edge 110 (FIG. 13). As shown in FIG. 14, lens 176 focuses laser beam 162 to produce a spot of diameter D over a length L. Outside of length L, laser beam 162 becomes unfocused and is characterized by an enlarged spot size and reduced power density. The length of L may be determined by the configuration of lens 176 (e.g., L may be 50 to 2000 microns or less than 100 microns or more than 100 microns). The diameter D may be about 60-100 microns (as an example).

Figure 15:
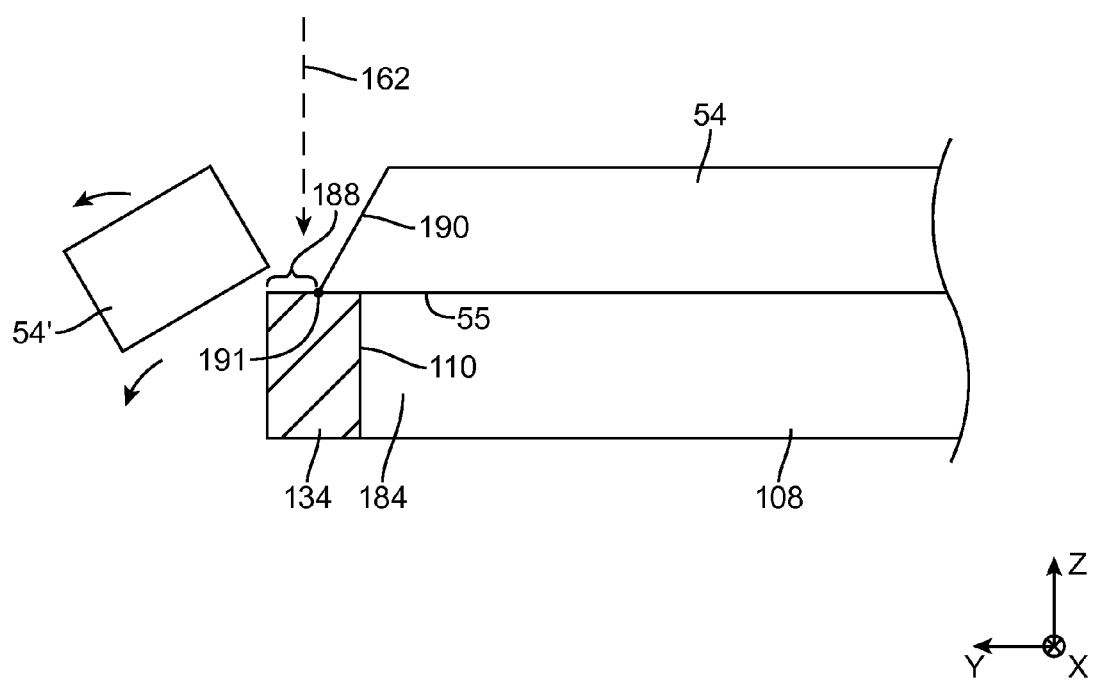
FIG. 15 is a cross-sectional side view of an illustrative polarizer being laser trimmed from a display layer with a protective edge coating in accordance with an embodiment.

Using polarizer trimming system 150 of FIG. 14, focused laser beam 162 of FIG. 14 is applied to polarizer 54 to trim away excess portions of polarizer 54 and thereby ensure that the lateral dimensions of polarizer 54 in dimensions X and Y match the respective lateral dimensions of glass layer 108 in dimensions X and Y. Laser beam 162 is preferably focused on the portion of polarizer 54 that lies just outside of edge 110 of glass layer 108. As shown in FIG. 15, this type of configuration ensures that laser beam 162 strikes portion 188 of edge coating 134, rather than being focused on portions 184 of glass layer 108 inside of peripheral edge 110 and on the surface of peripheral edge 110. Glass layer 108 can be damaged by excessive exposure to laser light and resulting heating of layer 108, so using system 150 of FIG. 13 to ensure that laser beam 162 is focused on coating layer 134 rather than layer 108 avoids degrading the strength and reliability of layer 108 from exposure to laser beam 162.

The profile of focused laser beam 162 of FIG. 14 generally causes polarizer 54 to acquire an angled (non-vertical) edge surface such as edge surface 190 of FIG. 15 when excess polarizer portions such as portion 54' are trimmed away from polarizer 54. Following trimming, the portion of edge 190 where edge 190 meets inner surface 55 of polarizer 54 (point 191 of FIG. 15) lies on coating layer 134 (as shown in FIG. 15) or lies directly over edge 110.

Figure 16:
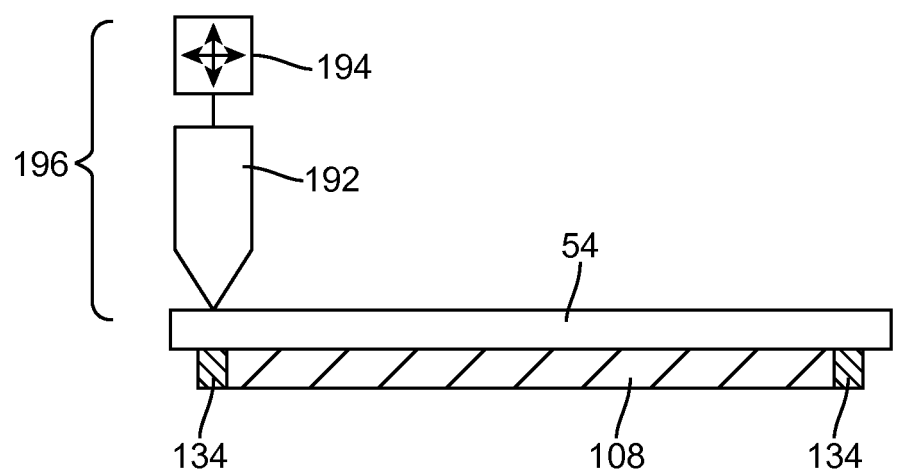
FIG. 16 is a cross-sectional side view of an illustrative polarizer trimming system having a cutting blade in accordance with an embodiment.

If desired, other types of polarizer trimming equipment may be used to remove excess portions of polarizer 54 and thereby ensure that polarizer 54 has a size and shape that matches that of glass layer 108. As shown in FIG. 16, for example, equipment 196 that includes a cutting blade such as knife 192 may be used in trimming polarizer 54 along edge 110 of glass layer 108. Equipment 196 includes computer-controlled positioner 194. Positioner 194 receives control commands from control unit 152 (FIG. 13) and/or support structures such as support structures 164 may be used to move polarizer 54 and glass layer 108 relative to blade 192. In this way, blade 192 cuts polarizer 54 along edge 110 of glass layer 108, above protective coating 134. Due to the presence of coating 134, the tip of blade 192 will not contact and damage glass layer 108.

Figure 17:
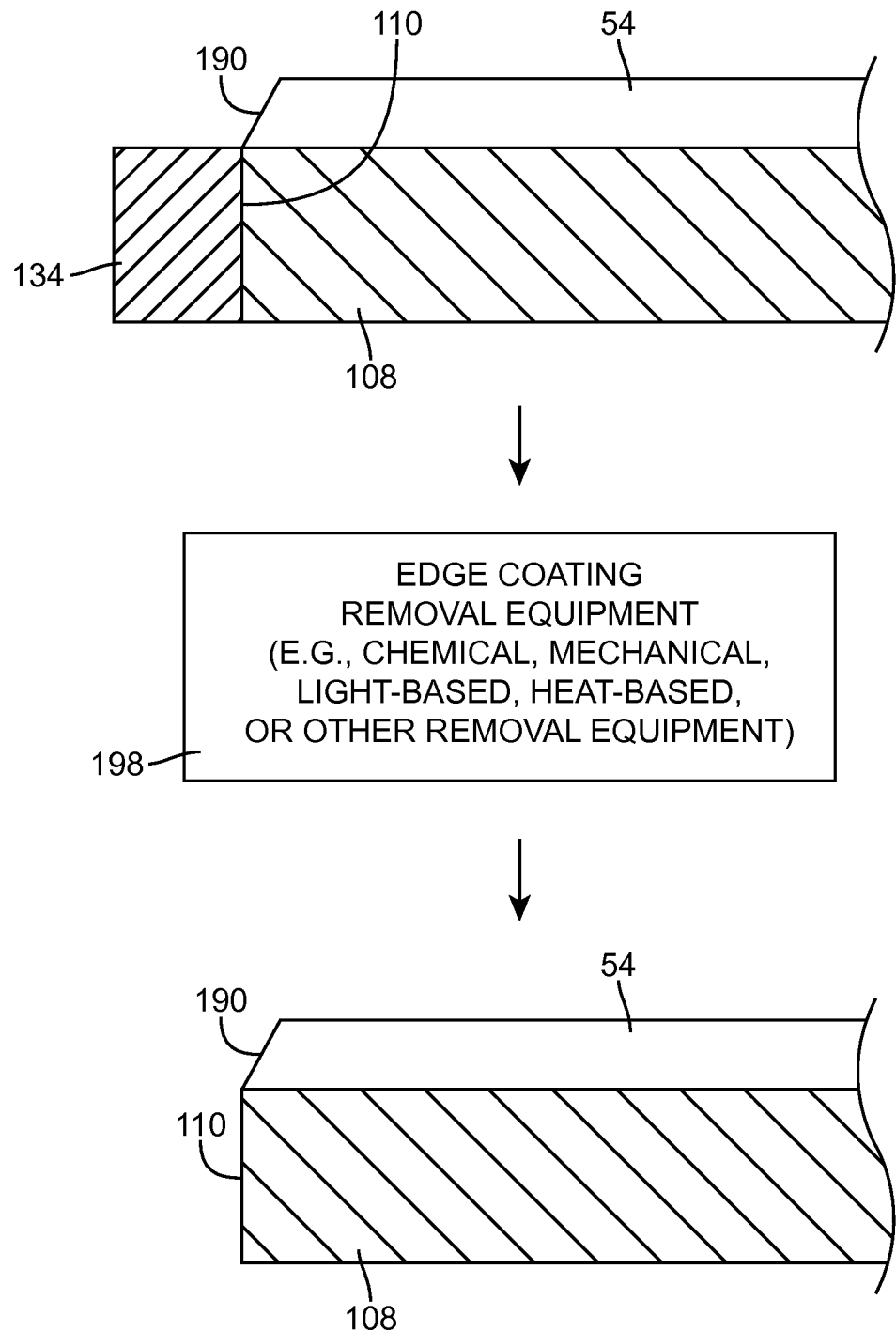
FIG. 17 is a diagram of a system in which an edge coating layer is being removed following polarizer trimming in accordance with an embodiment.

FIG. 17 shows how coating layer 134 may be removed following trimming. As shown in the upper portion of FIG. 17, this type of approach involves forming coating 134 on glass layer 108 and trimming away excess material 54' to form trimmed polarizer 54 on glass layer 108. During trimming operations, layer 134 can help protect edge 110 of glass layer 108 from damage. Following formation of trimmed polarizer 54 on glass layer 108 so that edge 190 of polarizer 54 is aligned with edge 110 of glass layer 108, edge coating removal equipment 198 uses chemical material removal techniques (e.g., wet and/or dry etching), light-based material removal techniques such as application of laser beam 162 or other laser light to edge 110, mechanical removal techniques, heat-based material removal techniques, and/or other material removal techniques to remove coating 134 from edge 110. Following removal of material 134, edge 110 is free of material 134 and is aligned with edge 190 of polarizer 54, as shown in the lower portion of FIG. 17.

Figure 18:
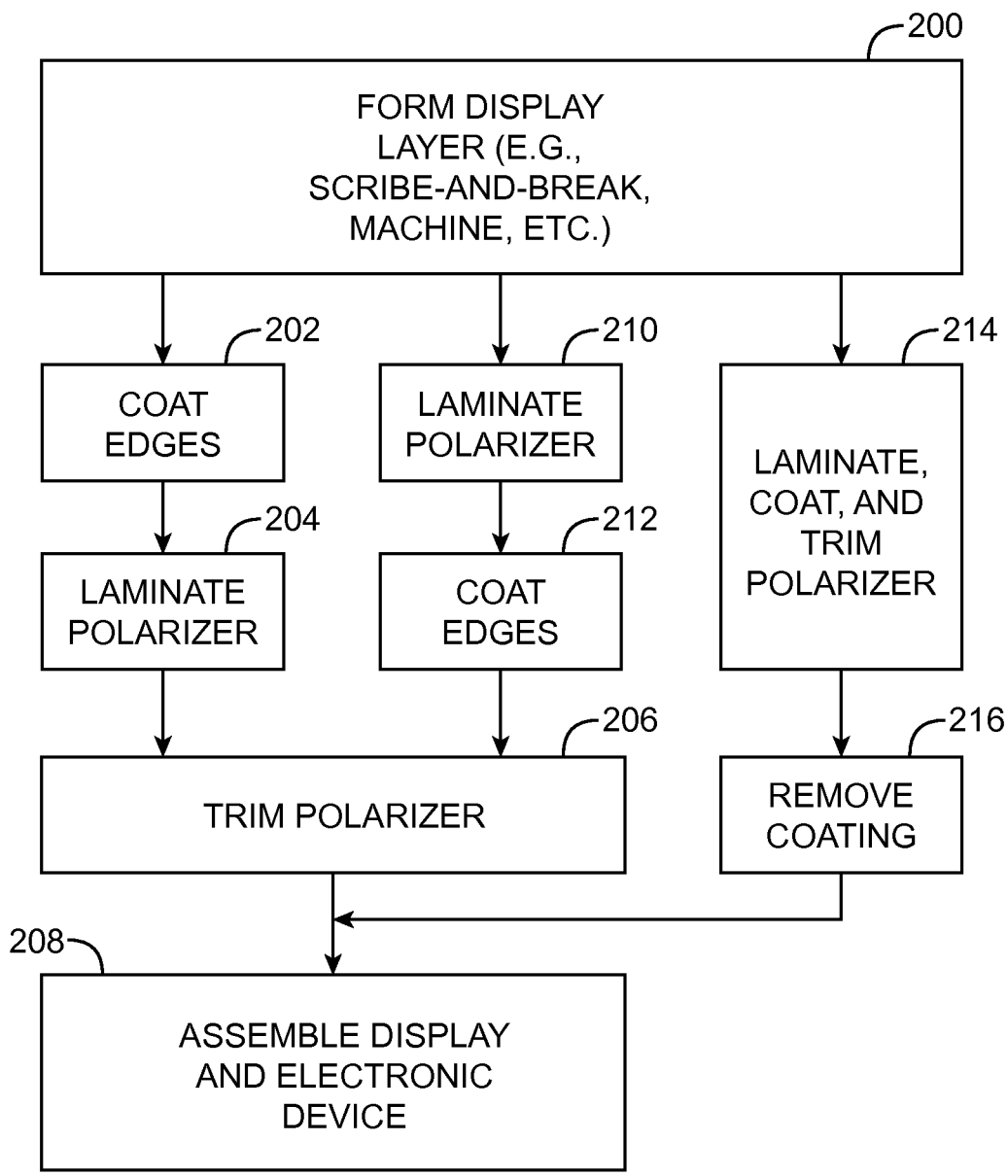
FIG. 18 is a flow chart of illustrative steps involved in forming electronic devices and displays by trimming polarizers on displays in accordance with an embodiment.

FIG. 18 is a flow chart of illustrative steps involved in forming display 14 and electronic device 10. As shown in FIG. 18, display layers such as display layer 108 (e.g., a color filter substrate for color filter layer 56 for display layers 46 in display 14 of FIG. 5) may be formed at step 200. The formation of display layer 200 may involve scribing and breaking glass layers such as layer 100 to form glass layers such as glass layer 108. Edges 110 of glass layer 108 may be machined using equipment 124.

Following formation of glass layer 108 at step 200, the edges of glass layer 108 such as peripheral edge 110 are coated with coating 134 at step 200. Polarizer layer 54 is then attached to the upper surface of glass layer 108. If desired, polarizer 54 may be attached to layer 108 before coating edge 110 with coating 134, as shown by steps 210 and 212.

At step 206, laser-based or cutting-blade-based trimming techniques are used to trim excess polarizer from the edges of glass layer 108. By trimming excess polarizer material away, the lateral dimensions of polarizer 54 are trimmed to match the lateral dimensions of glass layer 108.

As described in connection with FIG. 17, coating material 134 can be removed from edge 110. For example, during the operations of step 214, polarizer 54 may be attached to glass layer 108 and material 134 may be deposited as a coating on edge 110, followed by trimming of polarizer 54 to align edge 190 of polarizer 54 with edge 110 of glass layer 108 (step 214). Edge coating removal tool 198 (FIG. 17) may then be used to remove coating 134 (step 216).

Substrate 108 may form a liquid crystal display color filter layer substrate for color filter layer 56 of display 14 of FIG. 5. At step 208, the layers of display 14 may be assembled to form display 14 of FIG. 5 and display 14 may be installed in device housing 12 of electronic device 10 with other device components.

The foregoing is merely illustrative and various modifications can be made by those skilled in the art without departing from the scope and spirit of the described embodiments. The foregoing embodiments may be implemented individually or in any combination.

What is claimed is:

1. A display comprising:
    a color filter layer having a glass substrate with a peripheral edge;
    a thin-film transistor layer;
    a liquid crystal layer interposed between the color filter layer and the thin-film transistor layer;
    a polarizer attached to the glass substrate, wherein the polarizer has an inner surface; and
    a coating on the peripheral edge of the glass substrate, wherein a portion of the polarizer overlaps the coating such that the inner surface of the polarizer contacts the coating, and wherein the polarizer has a laser-trimmed edge and wherein a portion of the peripheral edge of the glass substrate is beveled.

2. The display defined in claim 1 wherein the coating comprises a polymer.

3. The display defined in claim 1 wherein the coating comprises an elastomeric polymer.

4. The display defined in claim 1 wherein the coating comprises silicone.

5. The display defined in claim 1 wherein the inner surface of the polarizer overlaps the beveled portion of the peripheral edge of the glass substrate.

6. The display defined in claim 1 wherein the coating is formed on the beveled portion of the peripheral edge of the glass substrate.

7. An electronic device, comprising:
a display layer having a peripheral edge surface;
a polarizer having a peripheral edge surface and an inner surface attached to the display layer; and
a coating on the peripheral edge surface of the display layer, wherein at least a portion of the peripheral edge surface of the polarizer is formed over the coating on the peripheral edge surface of the display layer, and wherein the peripheral edge surface of the display layer comprises a chamfered edge.

8. The electronic device of claim 7, wherein at least a portion of the polarizer extends beyond the peripheral edge surface of the display layer.

9. The electronic device defined in claim 8 wherein the portion of the polarizer that extends beyond the peripheral edge surface of the display layer contacts the coating on the peripheral edge surface of the display layer.

10. The electronic device defined in claim 7 wherein the coating extends beyond the peripheral edge surface of the polarizer.

11. The electronic device defined in claim 7, wherein a portion the coating is formed on the chamfered edge.

12. The electronic device defined in claim 11, wherein the inner surface of the polarizer contacts the portion of the coating formed on the chamfered edge.

13. A display comprising:
a display substrate having an edge surface;
a protective layer coated on the edge surface of the display substrate; and
a polarizer having an inner surface that is attached to the display substrate, wherein the inner surface extends beyond the edge surface of the display substrate, wherein the polarizer has a peripheral edge, wherein at least a portion of the peripheral edge extends beyond the edge surface of the display substrate, and wherein the peripheral edge of the polarizer is angled with respect to the edge surface of the display substrate.

14. The display defined in claim 13, wherein at least a portion of the inner surface of the polarizer contacts the protective layer.

15. The display defined in claim 14, wherein the peripheral edge of the polarizer meets the inner surface of the polarizer where the inner surface of the polarizer contacts the protective layer.

16. The display defined in claim 13, wherein the protective layer has a first surface formed on the edge surface of the display substrate and a second surface opposite the first surface, and wherein the second surface aligns with the peripheral edge of the polarizer.

* * * * *